US008264593B2

(12) United States Patent
Mori et al.

(10) Patent No.: US 8,264,593 B2
(45) Date of Patent: Sep. 11, 2012

(54) CAMERA DEVICE, AND METHOD AND PROGRAM FOR SUPPORTING FOCUS ADJUSTMENT

(75) Inventors: Yuuichirou Mori, Kanagawa (JP);
Masafumi Mizuno, Kanagawa (JP);
Yasuji Nakamura, Kanagawa (JP);
Shoji Hatta, Kanagawa (JP)

(73) Assignee: Panasonic Corporation, Osaka (JP)

( * ) Notice: Subject to any disclaimer, the term of this patent is extended or adjusted under 35 U.S.C. 154(b) by 216 days.

(21) Appl. No.: 12/918,146

(22) PCT Filed: Feb. 10, 2009

(86) PCT No.: PCT/JP2009/000525
§ 371 (c)(1),
(2), (4) Date: Aug. 18, 2010

(87) PCT Pub. No.: WO2009/104367
PCT Pub. Date: Aug. 27, 2009

(65) Prior Publication Data
US 2010/0328520 A1  Dec. 30, 2010

(30) Foreign Application Priority Data

Feb. 21, 2008  (JP) ................................. 2008-039653

(51) Int. Cl.
*H04N 5/232* (2006.01)
(52) U.S. Cl. ....................... 348/345; 359/823
(58) Field of Classification Search .................. 348/345, 348/357, 347; 396/72, 79, 82, 83, 133; 359/694, 359/823, 824
See application file for complete search history.

(56) References Cited

U.S. PATENT DOCUMENTS

| 5,305,036 | A | * | 4/1994 | Tanaka ........................... 359/823 |
| 5,654,833 | A | * | 8/1997 | Fujike et al. ................... 359/823 |
| 6,285,511 | B1 | * | 9/2001 | Kanayama et al. ............ 396/133 |
| 2002/0039242 | A1 | * | 4/2002 | Sasaki et al. ................... 359/823 |
| 2005/0128341 | A1 | * | 6/2005 | Murakami ..................... 348/345 |
| 2007/0098390 | A1 | | 5/2007 | Sasaki |

FOREIGN PATENT DOCUMENTS

| JP | 58-194006 A | 11/1983 |
| JP | 05-323422 A | 12/1993 |
| JP | 2002-072332 A | 3/2002 |
| JP | 2004-102113 A | 4/2004 |
| JP | 2004-333828 A | 11/2004 |
| JP | 2006-259072 A | 9/2006 |
| JP | 2007-127704 A | 5/2007 |
| JP | 2007-279677 A | 10/2007 |

OTHER PUBLICATIONS

International Search Report for PCT/JP2009/000525; May 19, 2009.

* cited by examiner

*Primary Examiner* — Aung S Moe
(74) *Attorney, Agent, or Firm* — Pearne & Gordon LLP (57) ABSTRACT

A camera device (1) includes an AF value calculating unit (14), a focus position determining unit (15), and an LED control unit (16). The AF value calculating unit (14) calculates an AF value from a camera image captured by an image imaging element (2). The focus position determining unit (15) determines a correct focus position based on the AF value. The LED control unit (16) controls light emission of an LED (13) provided in a main body (4) and indicates the correct focus position to a user. This allows to assist the user in focus adjustment by means of a light emitter provided in the main body. Thus, the camera device which allows the user by himself to adjust focus with ease without the help of others is provided.

5 Claims, 9 Drawing Sheets

CAMERA DEVICE, AND METHOD AND PROGRAM FOR SUPPORTING FOCUS ADJUSTMENT

TECHNICAL FIELD

The present invention relates to a camera device including the function of using a light emitter provided in the main body of the camera device to assist focus adjustment operation.

BACKGROUND ART

Surveillance cameras installed on ceilings and walls of facilities and buildings that use a varifocal lens have been known. A varifocal lens is a simplified version of a zoom lens and involves focus adjustment when zooming is performed. Focus adjustment of the varifocal lens can be accomplished by manually rotating a focus ring provided on a lens barrel. Such a mechanism is disclosed in Japanese Patent Laid-Open No. 5-323422 (pp. 3-4, FIG. 1), for example.

For a surveillance camera that uses such a varifocal lens, a monitor that outputs camera images are often provided in a location (for example in a surveillance monitor room) remote from the location where the surveillance camera is installed. In such a case, installation of the surveillance camera is performed usually by two operators. For example, one of the operators operates the camera to adjust the focus at the surveillance camera installation location and the other watches the monitor to check whether the focus is correct or not.

However, in conventional focus adjustment methods, it is not easy to achieve accurate focus and it takes a lot of labor and trouble for the installation since two operators perform focus adjustment in cooperation.

To save the labor and trouble required for the installation work, one operator performs focus adjustment without the help of others when installing the surveillance camera. Specifically, an operator who is installing the surveillance camera adjusts focus while watching a small portable monitor to check whether the focus is correct or not. However, although the operator may have confirmed on the small portable monitor that the correct focus has been achieved, the operator sometimes finds that an image on a large-screen monitor installed in a location such as a surveillance monitor room is defocused.

DISCLOSURE OF THE INVENTION

Problems to be Solved by the Invention

The present invention has been made under the circumstances described above. An object of the present invention is to provide a camera device capable of using a light emitter provided in the main body of the camera device to assist focus adjustment operation and allows one operator to easily adjust focus without the help of others.

Means for Solving the Problems

According to an aspect of the present invention, there is provided a camera device. The camera device includes a correct focus position determining unit determining a correct focus position representing a target position of focus adjustment on the basis of a parameter relating to a focus state calculated from a captured camera image, and a light emission control unit controlling light emission of a light emitter provided in a main body of the apparatus to indicate the correct focus position to a user.

According to another aspect of the present invention, there is provided a camera device. The camera device includes a correct focus position determining unit determining a correct focus position representing a target position of focus adjustment on the basis of a parameter relating to a focus state calculated from a captured camera image, a focus adjustment member rotatable relative to a base member during focus adjustment, and a torque control unit controlling friction torque of the focus adjustment member applied to the base member. The torque control unit controls the friction torque so that a maximum friction torque is applied in the correct focus position.

According to yet another aspect of the present invention, there is provided a focus adjustment assisting method which determines a correct focus position representing a target position of focus adjustment on the basis of a parameter relating to a focus state calculated from a captured camera image, and controls light emission of a light emitter provided in a main body of the apparatus to indicate the correct focus position to a user.

According to yet another aspect of the present invention, there is provided a focus adjustment assisting method which determines a correct focus position representing a target position of focus adjustment on the basis of a parameter relating to a focus state calculated from a captured camera image and, when a focus adjustment member is rotated relative to a base member during focus adjustment, controls friction torque of the focus adjustment member applied to the base member so that a maximum friction torque is applied in the correct focus position.

According to yet another aspect of the present invention, there is provided a focus adjustment assisting program which causes a computer to execute the processes of determining a correct focus position representing a target position of focus adjustment on the basis of a parameter relating to a focus state calculated from a captured camera image, and controlling light emission of a light emitter provided in a main body of the apparatus to indicate the correct focus position to a user.

According to yet another aspect of the present invention, there is provided a focus adjustment assisting program which causes a computer to execute the processes of determining a correct focus position representing a target position of focus adjustment on the basis of a parameter relating to a focus state calculated from a captured camera image and, when a focus adjustment member is rotated relative to a base member during focus adjustment, controlling friction torque of the focus adjustment member applied to the base member so that a maximum friction torque is applied in the correct focus position.

As will be described below, there are other aspects of the present invention. Therefore, the disclosure of the present invention is intended to provide some of the aspects of the present invention and is not intended to limit the scope of the present invention described and claimed herein.

DESCRIPTION OF SYMBOLS

1 Camera device
2 Imaging element
3 Lens
4 Main body
6 Focus lock knob
8 Focus ring
9 Electromagnet unit
10 Outer cylinder
11 Inner cylinder
12 button
13 LED
14 AF value calculating unit
15 Focus position determining unit
16 LED control unit
17 Torque control unit
20 LED
21 LED

BEST MODE FOR PERFORMING THE INVENTION

The present invention will be described below in detail. However, the following detailed description and the accompanying drawings are not intended to limit the present invention but instead the scope of the present invention is defined by the attached claims.

A camera device according to the present invention includes a correct focus position determining unit which determines a correct focus position representing a target position of focus adjustment on the basis of a parameter relating to a focus state calculated from a captured camera image and a light emission control unit which controls light emission of a light emitter provided in a main body of the camera device to indicate the correct focus position to a user.

With the configuration, a correct focus position is determined on the basis of a captured camera image and light emission of the light emitter is changed during focus adjustment to indicate the correct focus position to the user. Since the light emitter in the main body of the apparatus is used to assist focus adjustment in this way, an operator can easily adjust focus without the help of others. For example, since the operator can identify the correct focus position by light emission of the light emitter, the operator can adjust focus without using a small portable monitor or the help of other operators.

The camera device according to the present invention may include a focus adjustment member which is rotatable relative to a base member during focus adjustment and a torque control unit which controls friction torque of the focus adjustment member applied to the base member, and the torque control unit may control the friction torque so that the maximum friction torque is applied in a correct focus position.

With the configuration, the friction torque of the focus adjustment member is changed to indicate the correct focus position to the user. Since the maximum friction torque is applied in the correct focus position, the operator can find the correct focus position by the feel of a change in the friction torque while rotating the focus adjustment member. Furthermore, since the maximum friction torque is applied in the correct focus position, the focus adjustment member is inhibited from shifting after focus adjustment member is set at the focus position.

The torque control unit in the camera device of the present invention may control the friction torque so that the friction torque changes at a greater rate in a range from a position in which focus adjustment is restarted after the focus adjustment member has rotated past the correct focus position to the correct focus position than in a range from the start position of the focus adjustment to the correct focus position.

With the configuration, the friction torque gradually increases as the focus adjustment member is rotated from the start position of focus adjustment to the correct focus position. This allows the operator to sense the correct focus position in advance. When the focus adjustment member is rotated in the reverse direction from the focus adjustment restart position to the correct focus position, the friction torque abruptly increases in the correct focus position. This allows the operator to clearly sense the target position of focus adjustment and accurately accomplish focus adjustment with ease.

A camera device of the present invention includes a correct focus position determining unit which determines a correct focus position representing the target position of focus adjustment on the basis of a parameter relating to a focus state calculated from a captured camera image, a focus adjustment member which is rotatable relative to a base member during focus adjustment, and a torque control unit which controls friction torque of the focus adjustment member applied to the base member. The torque control unit controls the friction torque so that the maximum friction torque is applied in the correct focus position.

With this configuration, a correct focus position is determined on the basis of a captured camera image and the friction torque of the focus adjustment member is changed to indicate the correct focus position to a user during focus adjustment. Since the friction torque is controlled in this way to assist the operator in focus adjustment, the operator can easily adjust the focus without the help of others. In this case, since the maximum friction torque is applied in the correct focus position, the operator can find the correct focus position by the feel of a change in the friction torque while rotating the focus adjustment member. Accordingly, the operator can accomplish focus adjustment without using a small portable monitor, for example, or the help of other operators. Furthermore, since the maximum friction torque is applied in the correct focus position, the focus adjustment member is inhibited from shifting after focus adjustment member is set at the focus position.

In a focus adjustment assisting method of the present invention, a correct focus position representing a target position of focus adjustment is determined on the basis of a parameter relating to a focus state calculated from a captured camera image and light emission of a light emitter provided in a main body of a camera device is changed to indicate the correct focus position to a user.

According to the method, a correct focus position is determined on the basis of a captured camera image and light emission of the light emitter is changed during focus adjustment to indicate the correct focus position to the user. Since the light emitter in the main body of the apparatus is used to assist focus adjustment in this way, an operator can easily adjust focus without the help of others. For example, since the operator can identify the correct focus position by light emission of the light emitter, the operator can adjust focus without using a small portable monitor or the help of other operators.

In a focus adjustment assisting method of the present invention, a correct focus position representing a target position of focus adjustment is determined on the basis of a parameter relating to a focus state calculated from a captured camera image and friction torque of a focus adjustment member applied to a base member is controlled when the focus adjustment member is rotated with respect to the base member during focus adjustment so that the maximum friction torque is applied in the correct focus position.

According to the method, a correct focus position is determined on the basis of a captured camera image and the friction torque of the focus adjustment member is changed to indicate the correct focus position to a user during focus adjustment. Since the friction torque is controlled in this way to assist the operator in focus adjustment, the operator can easily adjust the focus without the help of others. In this case, since the maximum friction torque is applied in the correct focus position, the operator can find the correct focus position by the feel of a change in the friction torque while rotating the focus adjustment member. Accordingly, the operator can accomplish focus adjustment without using a small portable monitor, for example, or the help of other operators. Furthermore, since the maximum friction torque is applied in the correct focus position, the focus adjustment member is inhibited from shifting after focus adjustment member is set at the focus position.

A focus adjustment assisting program of the present invention causes a computer to perform the processes of determining a correct focus position representing a target position of focus adjustment on the basis of a parameter relating to a focus state calculated from a captured camera image and controlling light emission of a light emitter provided in a main body of a camera device to indicate the correct focus position to a user.

According to the program, a correct focus position is determined on the basis of a captured camera image and light emission of the light emitter is changed during focus adjustment to indicate the correct focus position to the user. Since the light emitter is used to assist focus adjustment in this way, an operator can easily adjust focus without the help of others. For example, since the operator can identify the correct focus position by light emission of the light emitter, the operator can adjust focus without using a small portable monitor or the help of other operators.

A focus adjustment assisting program of the present invention causes a computer to perform the processes of determining a correct focus position representing a target position of focus adjustment on the basis of a parameter relating to a focus state calculated from a captured camera image and controlling friction torque of a focus adjustment member applied to a base member when the focus adjustment member is rotated with respect to the base member during focus adjustment so that the maximum friction torque is applied in the correct focus position.

According to the program, a correct focus position is determined on the basis of a captured camera image and the friction torque of the focus adjustment member is changed to indicate the correct focus position to a user during focus adjustment. Since the friction torque is controlled in this way to assist the operator in focus adjustment, the operator can easily adjust the focus without the help of others. In this case, since the maximum friction torque is applied in the correct focus position, the operator can find the correct focus position by the feel of a change in the friction torque while rotating the focus adjustment member. Accordingly, the operator can accomplish focus adjustment without using a small portable monitor, for example, or the help of other operators. Furthermore, since the maximum friction torque is applied in the correct focus position, the focus adjustment member is inhibited from shifting after focus adjustment member is set at the focus position.

According to the present invention, the provision of the light emission control unit which controls the light emitter in the main body of the camera device to indicate the correct focus position to a user enables the light emitter provided in the main body of the apparatus to be used to assist in focus adjustment operation, thereby allowing an operator to easily accomplish focus adjustment without the help of others.

Camera devicees according to embodiments of the present invention will be described below with reference to drawings. The present embodiments will be described with respect to a dome surveillance camera with a varifocal lens by way of example. The surveillance camera is designed to be installed on a ceiling or a wall of a facility or a building. The camera device of any of the present embodiments includes the function of assisting in focus adjustment. The function is implemented by a program stored in a storage such as a memory of the apparatus.

(First Embodiment)

Figure 1:
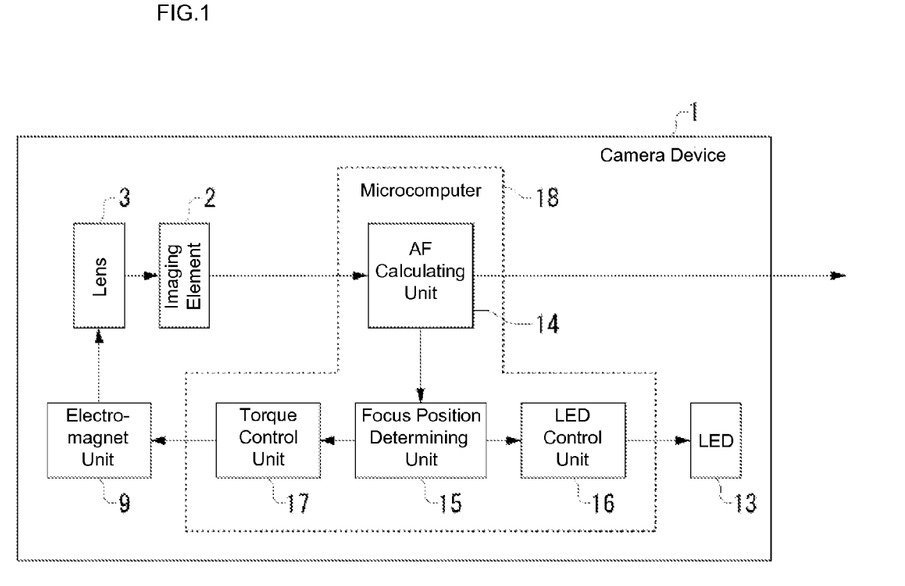
FIG. 1 is a block diagram of a camera device according to a first embodiment.
Figure 2:
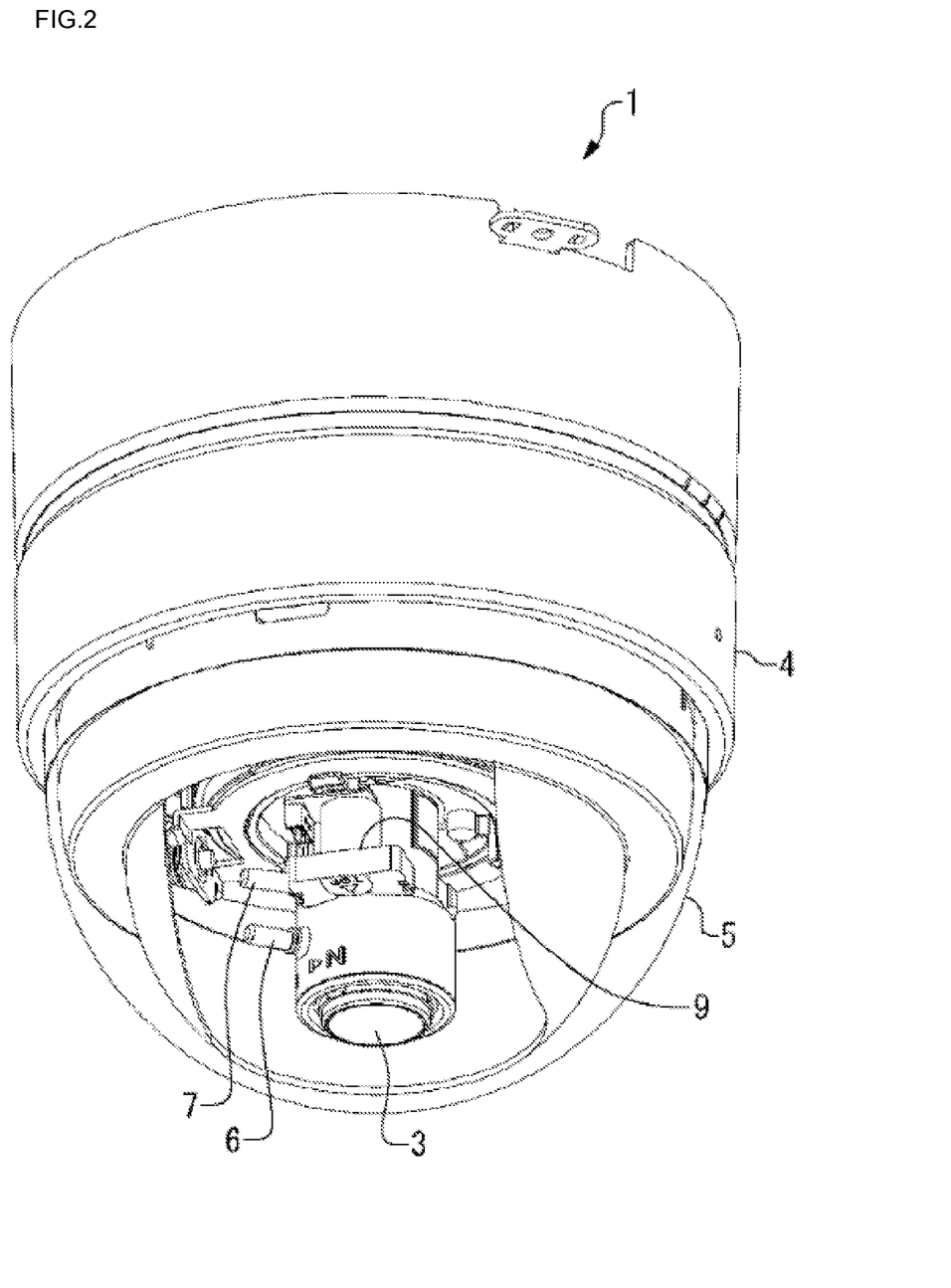
FIG. 2 is a perspective view of the camera device according to the first embodiment.
Figure 3:
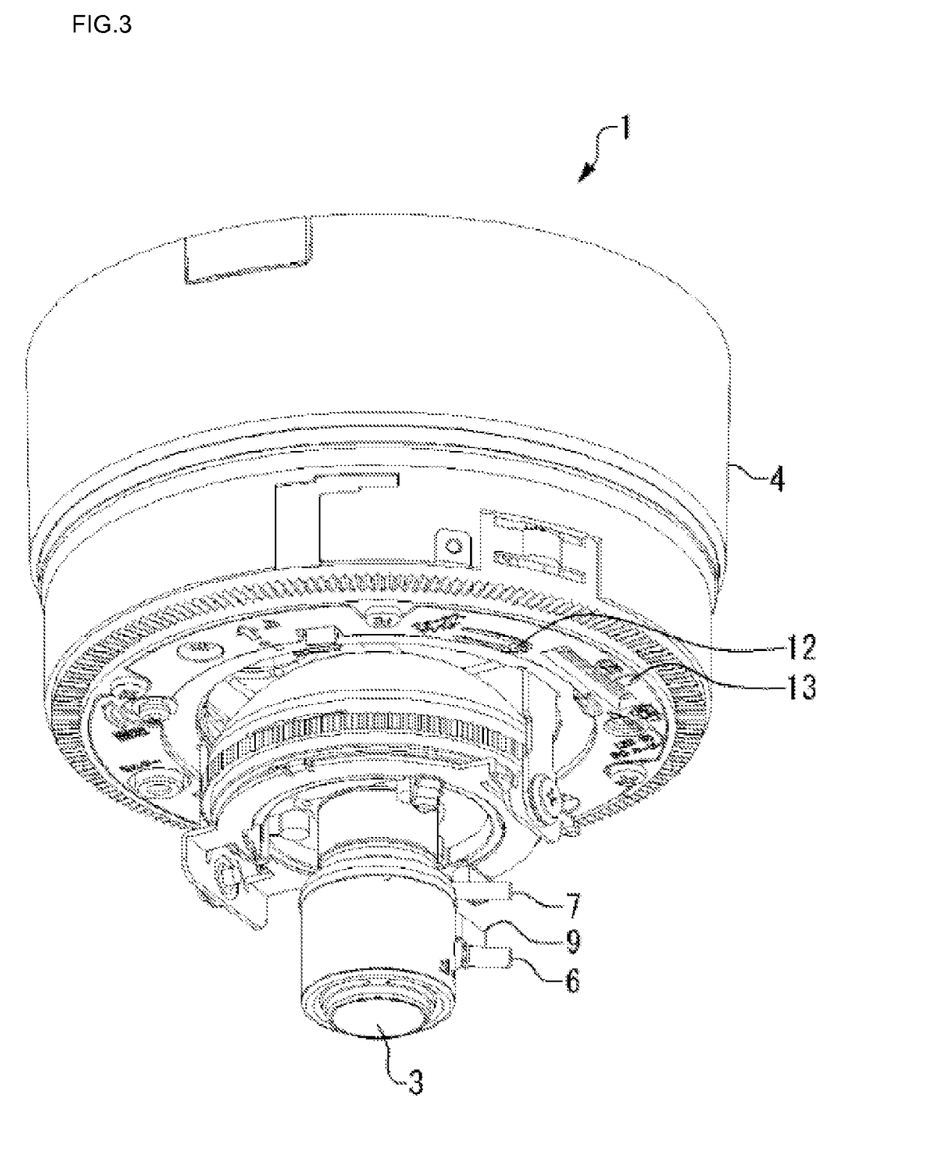
FIG. 3 is a perspective view of the camera device with a dome cover removed.
Figure 4:
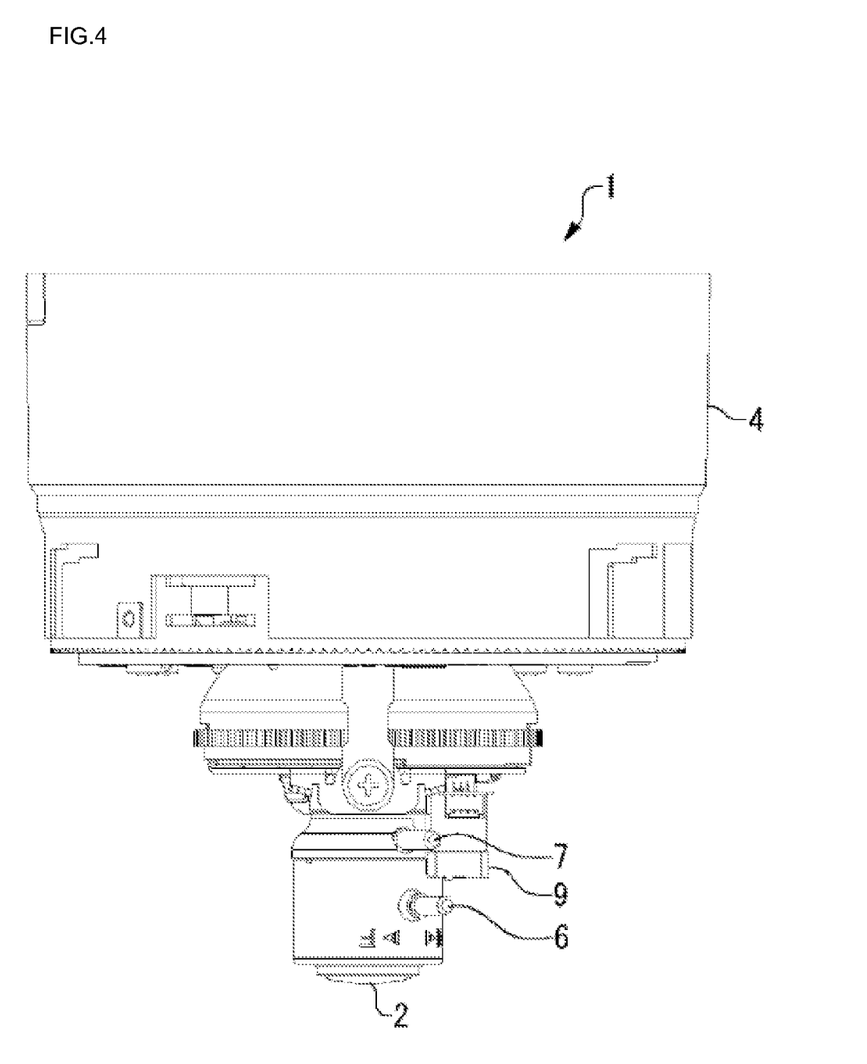
FIG. 4 is a side view of the camera device with the dome cover removed.
Figure 5:
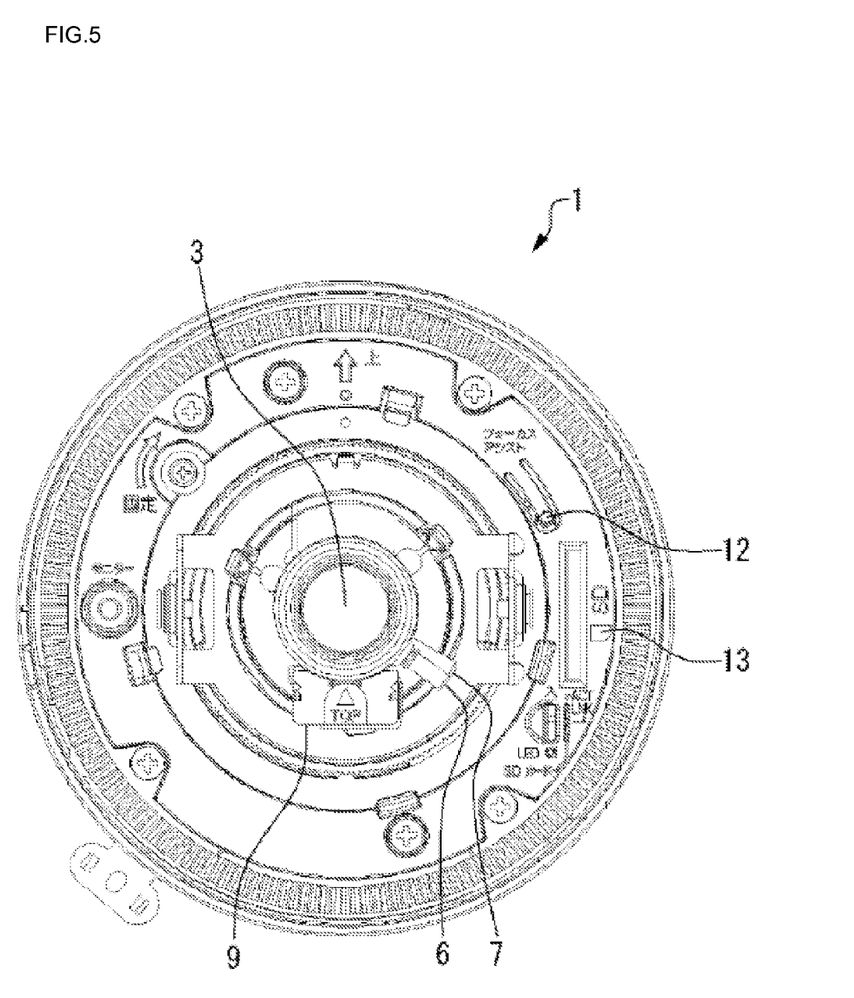
FIG. 5 is a plan view of the camera device with the dome cover removed.

A configuration of a camera device according to a first embodiment of the present invention will be described with reference to FIGS. 1 to 5. FIG. 1 is a block diagram illustrating a configuration of a camera device according to the present embodiment. FIG. 2 is a perspective view of the camera device, FIG. 3 is a perspective view of the camera device with a dome cover removed, FIG. 4 is a side view of the camera device with the dome cover removed, and FIG. 5 is a plan view of the camera device with the dome cover removed.

As illustrated in FIGS. 1 to 5, the camera device 1 includes a main body 4 including an image imaging element 2 and a lens 3 for capturing a camera image and a dome cover 5 for protecting the image imaging element 2 and the lens 3. The image imaging element 2 is a solid-state image imaging element such as a CCD or a CMOS device. The lens 3 is a varifocal lens, for example.

The varifocal lens 3 has a focus lock knob 6 used for manual focus adjustment and a zoom lock knob 7 used for manual zoom adjustment. The focus lock knob 6 is used as a handle for rotating a focus ring 8 during focus adjustment (see FIG. 7). Rotating the focus ring 8 about the optical axis of the lens 3 moves the lens 3 held by the focus ring 8 along the optical axis. By rotating the focus lock knob 6 circumferentially (about the axis of the knob 6), a force that presses the focus ring 8 can be adjusted to make switching between anti-rotation (lock) and rotation (unlock) of the focus ring 8 about the optical axis. Here, the focus ring 8 is equivalent to a focus adjustment member of the present invention.

The varifocal lens 3 has an electromagnet unit 9 so that the friction torque of the focus ring 8 can be controlled. In the present embodiment, the focus ring 8 is provided between an outer cylinder 10 and an inner cylinder 11 of the lens 3. The inner cylinder 11 is made of a magnetic material. The inner cylinder 11 can be magnetically attracted to one side of the outer cylinder 10 by controlling a voltage applied to the electromagnetic unit 9 (see FIG. 7). For example, the focus ring 8 can be clamped between the outer cylinder 10 and the inner cylinder 11 by increasing the magnetic force of the electromagnetic unit 9 to increase the friction torque of the focus ring 8.

A button 12 for performing focus adjustment and an LED 13 for indicating a correct focus position to a user are provided in the main body 4 of the apparatus. In the present embodiment, an LED for SD card is also used as the LED 13 for indicating a correct focus position. Of course, an LED 13 dedicated to indicating a correct focus position may be provided instead of sharing an LED with SD card.

The camera device 1 includes an AF value calculating unit which calculates an AF value (a high-frequency component of a spatial frequency value) from a camera image captured by the image imaging element 2 and a focus position determining unit which determines a correct focus position based on the AF value. The camera device 1 also includes an LED control unit which controls the voltage of the LED 13 to control lighting of the LED 13 to indicate a correct focus position to a user and a torque control unit which controls the voltage of the electromagnetic unit 9 to control the friction torque of the focus ring 8 to indicate the correct focus position to the user. The AF value calculating unit, the focus position determining unit, the LED control unit, and the torque control unit may be implemented by a microcomputer, for example. Here, the focus position determining unit is equivalent to a correct focus position determining unit of the present invention. The LED control unit is equivalent to a light emission control unit of the present invention and the torque control unit is equivalent to the torque control unit of the present invention.

A focus adjustment operation in the camera device 1 of the first embodiment configured as described above will be described with reference to FIGS. 6 to 8. While both LED lighting control and friction torque control are performed in the embodiment, these controls will be described separately for convenience of explanation.

(LED Lighting Control)

Figure 6:
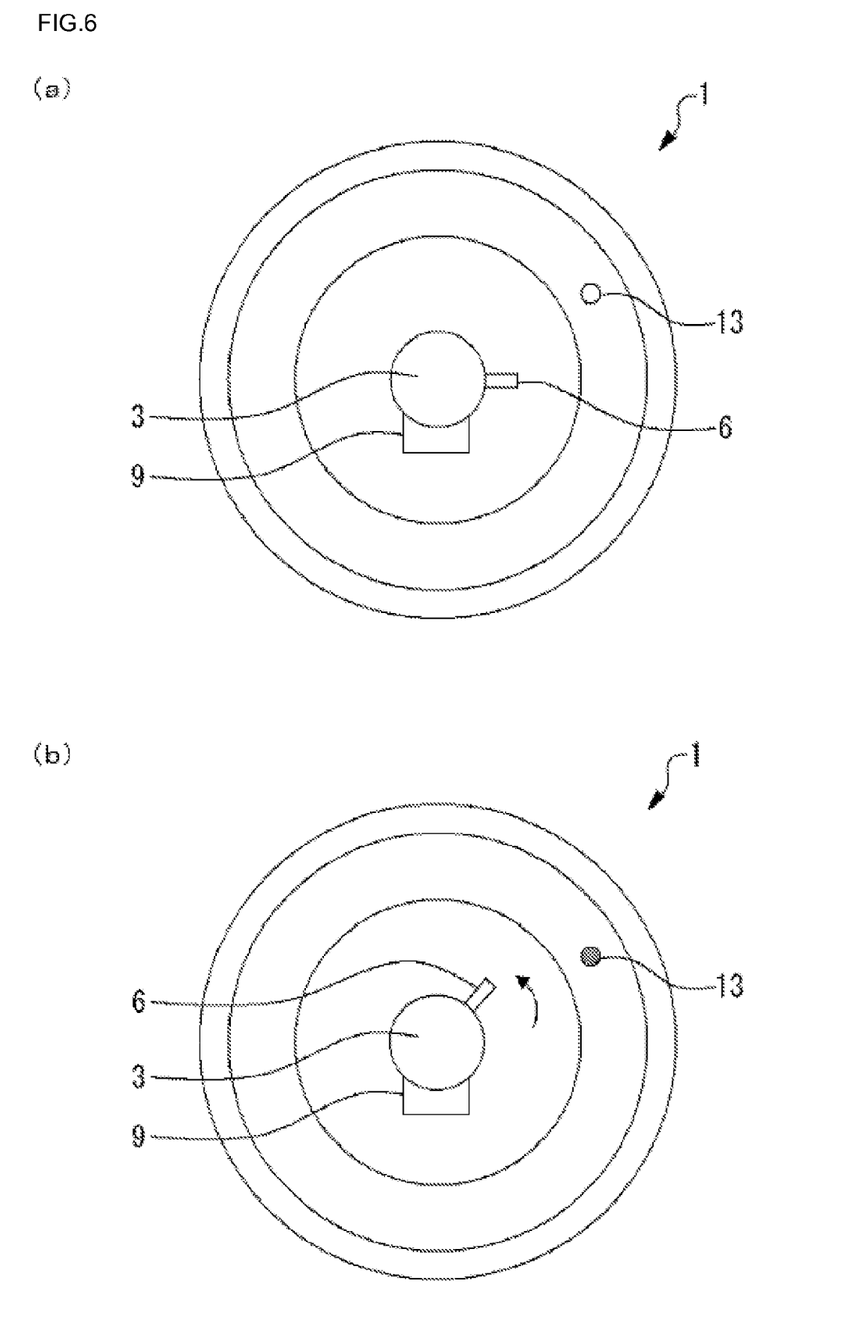
FIG. 6 is a diagram for explaining an LED lighting during focus adjustment.
Figure 8:
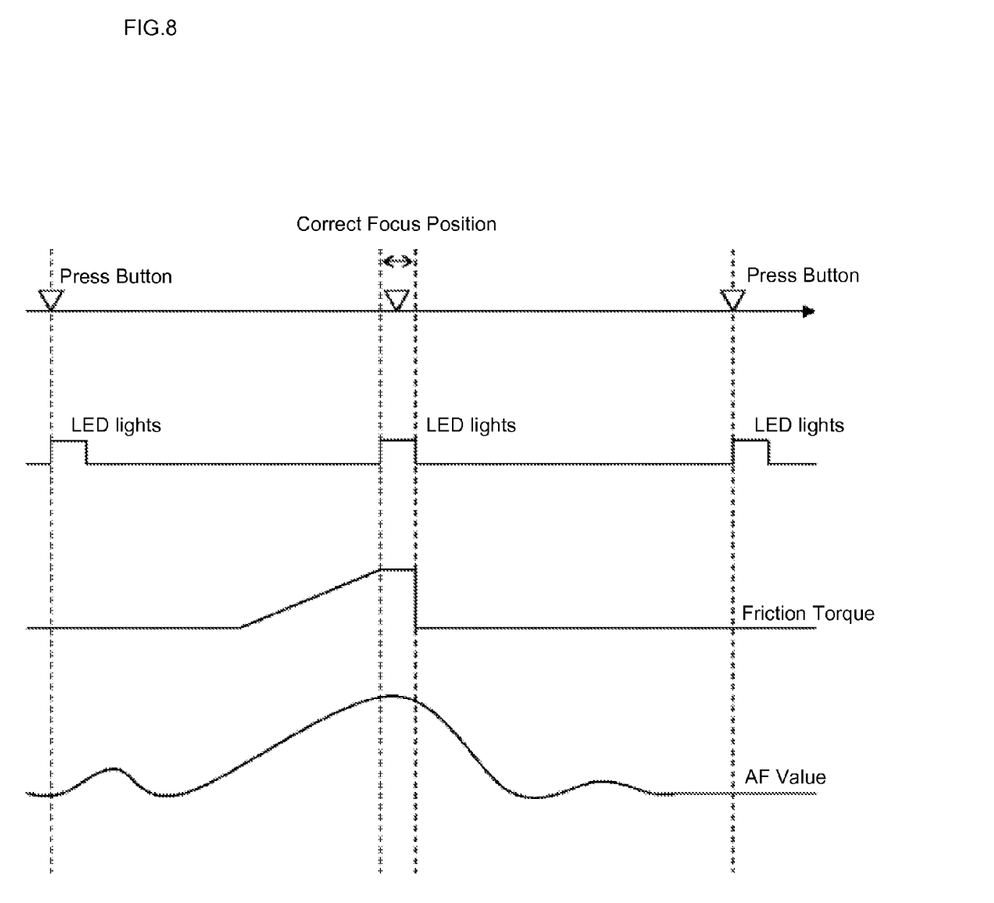
FIG. 8 is a diagram illustrating the relationship among a button operation, LED lighting, friction torque, and AF value during focus adjustment.

Control of lighting of the LED 13 will be described first with reference to FIGS. 6 and 8. FIG. 6(a) is a diagram illustrating lighting of the LED 13 during focus adjustment. FIG. 6(b) is a diagram illustrating lighting of the LED 13 in a correct focus position. FIG. 8 illustrates button operation and lighting of the LED 13 during focus adjustment.

After an operator (user) has mounted the camera device 1 on an installation location such as a ceiling, the operator (user) performs focus adjustment operation with the dome cover 5 removed. As illustrated in FIG. 8, when the operator presses the button 12 on the main body 4 of the apparatus to start the focus adjustment, the LED 13 turns on to indicate the start of focus adjustment. In this case, the LED 13 turns off after a few seconds (1 to 2 seconds for example). It can be said that the turning on (and off after a few seconds) of the LED 13 is lighting for indicating the start of focus adjustment.

Once focus adjustment is started, an AF value (a high-frequency component of a spatial frequency value) is calculated from camera images captured by the image imaging element 2 and the focus position in which the highest AF value is obtained is determined as a correct focus position. The operator (user) turns the focus lock knob 6 itself counterclockwise to reduce the force that is pressing the focus ring 8. Then, the operator (user) rotates the focus ring 8 about the optical axis (for example from EAR side to NEAR side) with the focus lock knob 6. When the correct focus position is reached, the LED 13 turns on to indicate that the correct focus position has been reached.

When the user stops rotating the focus ring 8 in the correct focus position, that is, when the user has successfully placed the focus ring 8 in the correct focus position, and the user presses the button 12 again, the LED 13 immediately turns off. This lets the user know that the adjusted position is the correct focus position. Therefore it can be said that the turning on of the LED 13 (and the turning off in response to pressing the button) is lighting for indicating the correct focus position.

On the other hand, when the user does not stop rotating the focus ring 8 in the correct focus position, that is, when the user has rotated the focus ring 8 past the correct focus position, and the user presses the button 12 again, the LED 13 turns off after a few seconds (1 to 2 seconds for example), instead of turning off immediately. This lets the user know that the adjusted position is not the correct focus position.

(Friction Torque Control)

Figure 7:
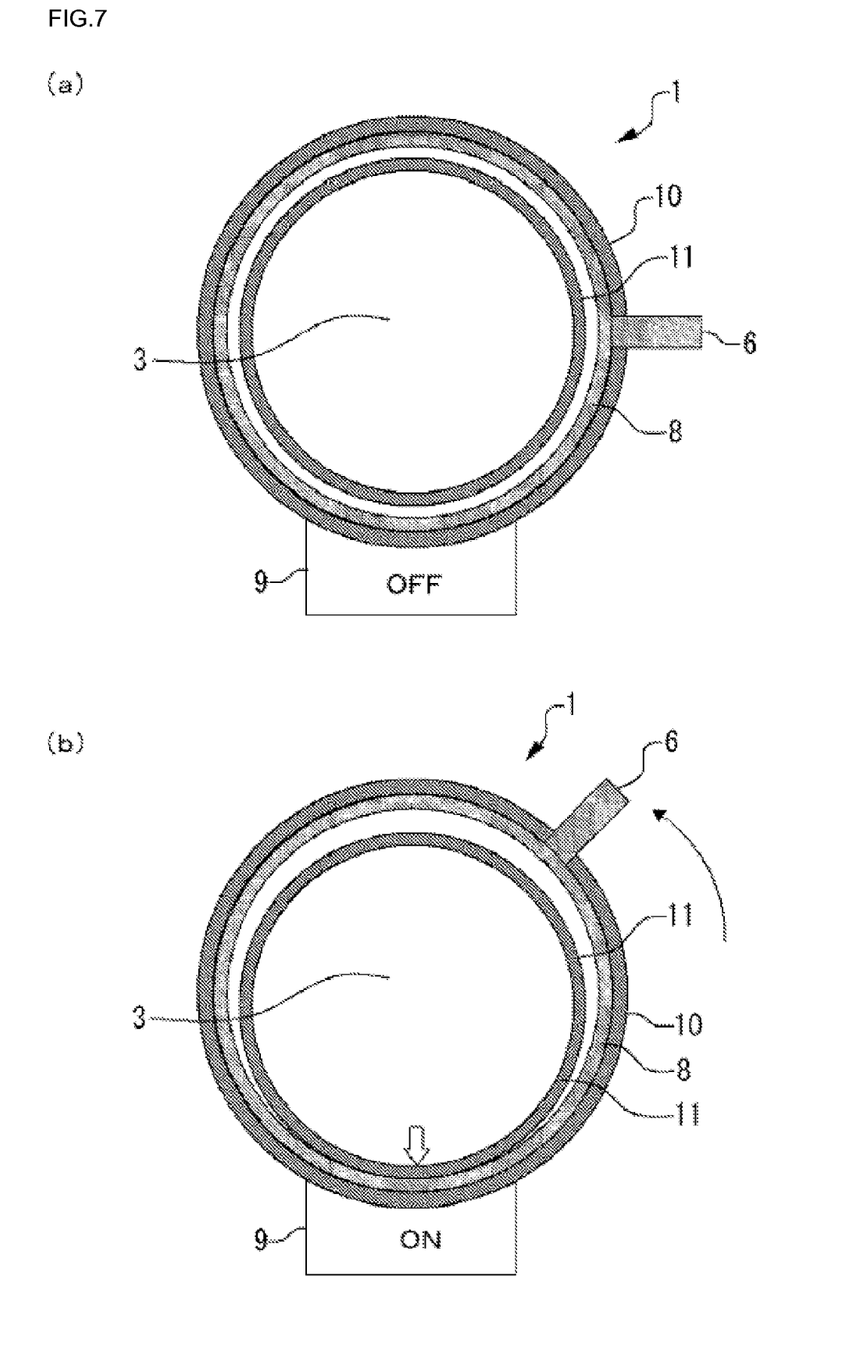
FIG. 7 is a diagram for explaining friction torque during focus adjustment.

Friction torque control will be described below with reference to FIGS. 7 and 8. FIG. 7(a) is a diagram for explaining friction torque during focus adjustment and FIG. 7(b) is a diagram for explaining friction torque in a correct focus position. FIG. 8 illustrates friction torque during focus adjustment.

As illustrated in FIG. 8, when the button 12 on the main body 4 of the apparatus is pressed to start focus adjustment, an AF value is calculated from a camera image captured by the image imaging element 2. The focus position in which the largest AF value is obtained is determined as a correct focus position.

Then the friction torque is controlled so that the friction torque reaches its peak in the correct focus position. The friction torque control is performed in such a manner that the friction torque gradually changes as the focus ring 8 rotates from the start position of focus adjustment to the correct focus position. In the example in FIG. 8, a sloped gradient is formed to the left of the correct focus position indicating that the friction torque gradually increases at a substantially constant rate.

Then, in the correct focus position, the maximum friction torque is applied. Accordingly, the friction resistance caused when the user rotates the focus ring 8 reaches its peak in the correct focus position and the user can find the correct focus position by feel. Once the user identifies the correct focus position, the user turns the focus lock knob 6 itself clockwise to press the focus ring 8, whereby the rotation of the focus ring 8 about the optical axis is locked.

Once the user stops rotating the focus ring 8 in the correct focus position, the maximum friction torque in the correct focus position prevents the focus ring 8 from being moved by slight external forces. In particular, the focus ring 8 is effectively kept from moving off the adjusted focus position when the user turns the focus lock knob 6 in order to lock the focus ring 8.

Once the focus ring 8 has been locked by rotating the focus lock knob 6, the torque control unit 17 stops voltage control applied to the electromagnetic unit 9 to release the friction torque of the focus ring 8, thereby reducing power consumption in the main body of the camera device. The voltage control applied to the electromagnetic unit 9 may be stopped upon expiration of the timeout period (for example 2 minutes) of a timer (not depicted), for example, which has been activated by pressing the button 12 to start the focus adjustment.

If the user has not stop rotating the focus ring 8 in the correct focus position, focus adjustment is restarted at a position on the opposite side (a position to the right of the correct focus position in the example in FIG. 8) from the start position of the focus adjustment. Friction torque control is performed to abruptly change the friction torque in the range from the focus adjustment restart position to the correct focus position. In the example in FIG. 8, a wall-like gradient in which the friction torque abruptly changes is formed to the right of the correct focus position.

Therefore, when the user rotates the focus adjustment member in the reverse direction from the focus adjustment restart position to the correct focus position, the friction torque abruptly increases in the correct focus position. Since the abrupt slope (wall) of the friction torque is formed on the opposite side of the correct focus position, the user can clearly find the correct focus position by feel.

(Adjustment of Depth of Field)

When the camera device 1 according to the present embodiment is installed, the depth of field is adjusted. Adjustment of the depth of field will be described below.

The iris (iris diaphragm) of a conventional surveillance camera is closed when focus adjustment is performed in a bright environment such as in daylight during installation operation of the surveillance camera and accordingly the depth of field is large and defocus is not caused even if a focus position is slightly inaccurately set. However, at nighttime or when a light-blocking dome cover such as a smoked dome cover is attached, the amount of light incident on the image imaging element of the surveillance camera decreases as compared with the amount of light incident during the focus adjustment. Since the iris is opened in such a dark environment, the depth of field decreases and defocus is caused by a slightly inaccurate focus position.

According to the present embodiment, the iris of the camera device 1 is opened when focus adjustment is performed without the dome cover 5 during installation operation of the camera device. The focus adjustment described above is performed with a small depth of field (with the iris opened) in this way. After completion of the focus adjustment, the dome cover 5 is attached.

Since the focus position is adjusted with a small depth of field in the present embodiment, defocus can be inhibited even when the amount of light incident on the image imaging element of the surveillance camera is decreased at nighttime or by an attached light-blocking dome cover such as a smoked dome cover. The iris is opened to decrease the depth of field in response to a press of the button 12 on the main body 4 of the apparatus.

The camera device 1 according to the first embodiment of the present invention is capable of controlling lighting of the LED 13 provided in the main body 4 of the apparatus to indicate a correct focus position to a user to assist the user in performing focus adjustment operation, thereby allowing the operator (user) to easily perform focus adjustment without the help of other operators. Generally, surveillance cameras are installed up high. For the safety of the operator, it is advantageous to be able to perform fine focus adjustment with both hands without using a small monitor.

According to the present embodiment, a correct focus position is determined on the basis of a captured camera image and lighting of the LED 13 is changed to indicate the correct focus position to a user during focus adjustment. Since the LED 13 provided in the main body 4 of the apparatus is used to assist focus adjustment operation in this way, the operator can easily adjust the focus without the help of others. For example, the operator can adjust the focus without using a small portable monitor or the help of other operators since the operator can identify the correct focus position by lighting of the LED 13.

According to the present embodiment, the friction torque of the focus ring 8 is changed to indicate the correct focus position to the user. Since the maximum friction torque is applied in the correct focus position, the operator can find the correct focus position by the feel of a change in the friction torque as the operator rotates the focus ring 8. Furthermore, since the maximum friction torque is applied in the correct focus position, the focus ring 8 is prevented from rotating after the focus ring 8 has been rotated to the correct focus position.

The friction torque gradually increases as the focus ring 8 is rotated from the start position of focus adjustment to the correct focus position. This allows the operator to sense the correct focus position in advance. When the focus ring 8 is rotated in the reverse direction from the focus adjustment restart position to the correct focus position after the focus ring 8 has rotated past the correct focus position, the friction torque abruptly increases in the correct focus position. This allows the operator to clearly sense the focus adjustment target position and to accurately adjust the focus with ease.

(Second Embodiment)

A camera device 1 according to a second embodiment of the present invention will be described with reference to FIG. 9. The following description will focus on differences of the camera device 1 of the second embodiment from that of the first embodiment. The configuration and operations of the camera device 1 of the second embodiment are the same as those in the first embodiment unless otherwise stated.

A configuration of the camera device 1 according to the second embodiment will be described first. The camera device 1 of the present embodiment differs from that of the first embodiment in that the camera device 1 of the second embodiment includes two LEDs for indicating a correct focus position to a user. As illustrated in FIG. 9, two LEDs 20 and 21 are provided on the NEAR and FAR sides, respectively, in the present embodiment. The two LEDs 20 and 21 in the present embodiment are dedicated to indication of a correct focus position. However, the LEDs 20 and 21 may also be used for other purposes (for example as LEDs for SD card), of course.

An operation of the camera device 1 of the second embodiment configured as described above will be described with reference to FIG. 9. The operation of the camera device 1 of the present embodiment differs from the operation of the first embodiment in that the second embodiment uses the two LEDs 20 and 21 in LED lighting control.

(LED Lighting Control)

Figure 9:
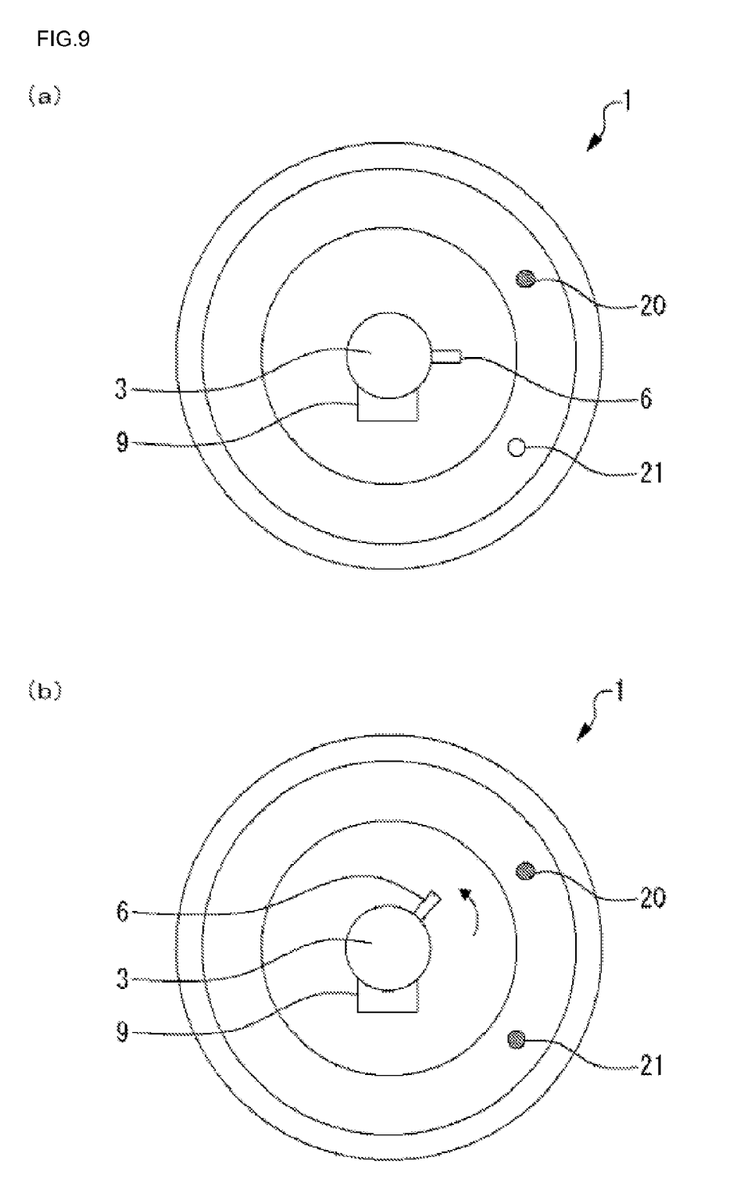
FIG. 9 is a diagram for explaining control of LED lighting during focus adjustment according to a second embodiment.

Referring to FIG. 9, control of lighting of the LEDs 20 and 21 will be described. FIG. 9($a$) is a diagram illustrating lighting of the LEDs 20 and 21 during focus adjustment; FIG. 9($b$) is a diagram illustrating lighting of LEDs 20 and 21 in a correct focus position.

As illustrated in FIG. 9, when a button 12 on a main body 4 of the apparatus is pressed to perform focus adjustment, the LED 20, 21 turns on to indicate the start of focus adjustment. In this case, only one of the LEDs turns on (for example the LED 20 on the NEAR side) turns on (indicated by hatching in FIG. 9) and then turns off after a few seconds (1 to 2 seconds, for example). It can be said that the turning on of the LED 20 (here, one LED 20 alone turns on and then turns off after a few seconds) is lighting for indicating the start of focus adjustment. In this case, the LED 20 that indicates the direction in which the focus ring 8 (for example the NEAR direction) is to be rotated turns on. It can be said that the lighting of the LED 20 is guidance lighting for guiding the user into an appropriate rotation direction in focus adjustment.

After focus adjustment is started, an AF value (a high-frequency component of a spatial frequency value) is calculated from a camera image captured by the image imaging element 2 and the focus position in which the highest AF value is obtained is determined as the correct focus position. The user rotates the focus lock knob 6 itself counterclockwise to reduce the force that presses the focus ring 8. Then the user rotates the focus ring 8 about the optical axis (toward the NEAR side) with the focus lock knob 6. When the correct focus position is reached, the LEDs 20 and 21 turn on to indicate that the correct focus position has been reached. In this case, both LEDs 20 and 21 turn on.

When the user stops rotating the focus ring 8 in the correct focus position, that is, when the user has successfully placed the focus ring 8 in the correct focus position, and the user presses the button 12 again, the two LEDs 20 and 21 immediately turn off. This lets the user know that the adjusted position is the correct focus position. Therefore it can be said that the turning on of the LEDs 20 and 21 (and the turning off in response to pressing the button) is lighting indicating the correct focus position.

On the other hand, when the user does not stop rotating the focus ring 8 in the correct focus position, that is, when the user has rotated the focus ring 8 past the correct focus position, and the user presses the button 12 again, only the other LED 21 (for example the LED 21 on the FAR direction side) turns on and then turns off after a few seconds (for example 1 to 2 seconds). This lets the user know that the adjusted position is not the correct focus position. The user can also know that the direction in which the focus ring 8 is to be rotated for focus adjustment is the FAR direction.

The camera device 1 according to the second embodiment of the present invention described above has the same advantageous effects as those of the first embodiment.

While embodiments of the present invention have been described by way of example, the scope of the present invention is not limited to those embodiments. Changes and modification can be made to the embodiments depending on purposes without departing from the scope defined by the claims.

While embodiments of the present invention that are considered at present to be preferred, it would be understood that various variations of the present embodiments are possible and the attached claims are intended to include all such variations without departing from the true spirit and scope of the present invention.

Industrial Applicability

As has been described, the camera device according to the present invention is capable of using a light emitter provided in the main body of the apparatus to assist an operator in performing focus adjustment operation, has the advantageous effect of allowing the operator to easily perform focus adjustment without the help of others, and is useful as an surveillance camera using a varifocal lens.

The invention claimed is:

1. A camera device comprising:
a correct focus position determining unit which determines a correct focus position on the basis of a parameter relating to a focus state calculated from a captured camera image, the correct focus position being a target position of focus adjustment;
a focus adjustment member which is rotatable relative to a base member during focus adjustment; and
a torque control unit which controls friction torque of the focus adjustment member applied to the base member, wherein
the torque control unit controls the friction torque so that a maximum friction torque is applied in the correct focus position, and wherein
the torque control unit controls the friction torque so that a friction torque change rate in a range from a position in which focus adjustment is restarted after the correct focus position has been passed to the correct focus position is greater than a friction torque change rate in a range from a start position of the focus adjustment to the correct focus position.

2. The camera device according to claim 1, wherein
the torque control unit controls the friction torque so as to release the friction torque after predetermined time period from pressing button for starting the focus adjustment.

3. A focus adjustment assisting method comprising:
determining a correct focus position on the basis of a parameter relating to a focus state calculated from a captured camera image, the correct focus position being a target position of focus adjustment;
controlling, when a focus adjustment member is rotated relative to a base member during focus adjustment, friction torque of the focus adjustment member applied to the base member so that a maximum friction torque is applied in the correct focus position; and
controlling the friction torque so that a friction torque change rate in a range from a position in which focus adjustment is restarted after the correct focus position has been passed to the correct focus position is greater than a friction torque change rate in a range from a start position of the focus adjustment to the correct focus position.

4. The focus adjustment assisting method according to claim 3, comprising
controlling the friction torque so as to release the friction torque after predetermined time period from pressing button for starting the focus adjustment.

5. A focus adjustment assisting program which is recorded in a computer-readable storage device and causes a computer to execute the processes of:
determining a correct focus position on the basis of a parameter relating to a focus state calculated from a captured camera image, the correct focus position being a target position of focus adjustment;
controlling, when a focus adjustment member is rotated relative to a base member during focus adjustment, friction torque of the focus adjustment member applied to the base member so that a maximum friction torque is applied in the correct focus position; and
controlling the friction torque so that a friction torque change rate in a range from a position in which focus adjustment is restarted after the correct focus position has been passed to the correct focus position is greater than a friction torque change rate in a range from a start position of the focus adjustment to the correct focus position.

* * * * *